(12) United States Patent
Vassallo et al.

(10) Patent No.: US 9,353,670 B2
(45) Date of Patent: May 31, 2016

(54) EXHAUST GAS RECIRCULATION SYSTEM FOR AN INTERNAL COMBUSTION ENGINE

(75) Inventors: Alberto Vassallo, Turin (IT); Hans H. Drangel, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 820 days.

(21) Appl. No.: 13/585,413

(22) Filed: Aug. 14, 2012

(65) Prior Publication Data

US 2013/0042841 A1    Feb. 21, 2013

(30) Foreign Application Priority Data

Aug. 17, 2011    (GB) .................................. 1114147.0

(51) Int. Cl.
| | |
|---|---|
| F02B 47/08 | (2006.01) |
| F02M 25/07 | (2006.01) |
| F01P 3/20 | (2006.01) |
| F01P 7/16 | (2006.01) |
| F02B 29/04 | (2006.01) |
| F02D 13/02 | (2006.01) |

(52) U.S. Cl.
CPC . *F01P 3/20* (2013.01); *F01P 7/165* (2013.01); *F02M 25/0728* (2013.01); *F02M 25/0731* (2013.01); *F02M 25/0732* (2013.01); *F02M 25/0738* (2013.01); *F01P 2060/16* (2013.01); *F02B 29/0406* (2013.01); *F02D 13/0219* (2013.01); *F02M 25/0707* (2013.01); *Y02T 10/121* (2013.01)

(58) Field of Classification Search
CPC .......... F02M 25/0707; F02M 25/0728; F02M 25/0731; F02M 25/0732; F02M 25/0737; F02M 25/0738; F01P 3/20; F01P 7/165; F28D 7/0091; F28D 9/0093; F02B 29/0406; F02B 29/0412; F02B 29/0418; Y02T 10/121

USPC ........... 123/568.12; 165/DIG. 113, DIG. 112; 60/605.2

See application file for complete search history.

(56) References Cited

U.S. PATENT DOCUMENTS

| | | | | |
|---|---|---|---|---|
| 4,961,404 | A * | 10/1990 | Itakura et al. | 123/41.31 |
| 5,669,338 | A * | 9/1997 | Pribble et al. | 123/41.29 |
| 7,454,896 | B2 * | 11/2008 | Chalgren et al. | 60/278 |
| 7,461,641 | B1 | 12/2008 | Styles | |
| 7,581,533 | B1 * | 9/2009 | Moran | 123/568.12 |

(Continued)

FOREIGN PATENT DOCUMENTS

| | | |
|---|---|---|
| GB | 2473821 A | 3/2011 |
| WO | WO 2010/123409 A1 | 10/2010 |

*Primary Examiner* — Mahmoud Gimie
*Assistant Examiner* — David Hamaoui
(74) *Attorney, Agent, or Firm* — John A. Miller; Miller IP Group, PLC

(57) ABSTRACT

An exhaust gas recirculation system for an internal combustion engine comprising an exhaust gas recirculation conduit fluidly connecting an exhaust manifold to an intake manifold of the internal combustion engine, first and second exhaust gas coolers located in series in the exhaust gas recirculation conduit, each of the first and second exhaust gas coolers comprising an inlet and an outlet fluidly connected to a first and a second coolant circuit respectively, wherein the second coolant circuit comprises a radiator having a coolant inlet in fluid communication with the coolant outlet of the second exhaust gas cooler, a pump having a coolant inlet in fluid communication with a coolant outlet of the radiator and a coolant outlet in fluid communication with the coolant inlet of the second exhaust gas cooler, and an additional conduit fluidly connecting the coolant outlet of the exhaust cooler.

14 Claims, 3 Drawing Sheets

(56) References Cited

U.S. PATENT DOCUMENTS

| | | | |
|---|---|---|---|
| 7,617,679 B2* | 11/2009 | Kardos et al. | 60/605.2 |
| 8,061,334 B2* | 11/2011 | Eitel et al. | 123/568.12 |
| 8,434,432 B2* | 5/2013 | Magro | 123/41.1 |
| 8,528,529 B2* | 9/2013 | Ewen | 123/568.12 |
| 8,584,457 B2* | 11/2013 | Kardos et al. | 60/599 |
| 8,627,807 B2* | 1/2014 | Wikstrom | 123/568.12 |
| 8,695,340 B2* | 4/2014 | Kardos et al. | 60/605.2 |
| 8,967,126 B2* | 3/2015 | Vassallo et al. | 123/568.12 |
| 2008/0264609 A1* | 10/2008 | Lutz et al. | 165/104.19 |
| 2009/0260605 A1* | 10/2009 | Janssen et al. | 123/568.12 |
| 2011/0139131 A1* | 6/2011 | Kardos et al. | 123/542 |
| 2014/0075973 A1* | 3/2014 | Graaf et al. | 62/115 |

* cited by examiner

EXHAUST GAS RECIRCULATION SYSTEM FOR AN INTERNAL COMBUSTION ENGINE

TECHNICAL FIELD

The present invention relates to an exhaust gas recirculation system for an internal combustion engine, in particular an internal combustion engine of a motor vehicle.

BACKGROUND

In order to reduce the polluting emission, most internal combustion engines, principally Diesel engines, are equipped with an exhaust gas recirculation (EGR) system, for selectively routing back a part of the exhaust gas from the exhaust manifold of the internal combustion engine into the intake manifold of the internal combustion engine. The recirculated exhaust gas is mixed with fresh induction air and is fed into the engine cylinders, thereby reducing the production of oxides of nitrogen ($NO_x$) during the combustion process.

Conventional EGR systems comprise an EGR conduit fluidly connecting the exhaust manifold to the intake manifold, an EGR cooler located in the EGR conduit for cooling the exhaust gas before mixing it with the induction air, and a valve for regulating the flow rate of the exhaust gas to be recirculated in the EGR conduit.

The temperature of the exhaust gas exiting from the EGR cooler is critical both to the $NO_x$ control process and to the integrity of the EGR cooler and the downstream components, such as EGR conduits, EGR flow control valves, and the engine.

In order to improve temperature control of the exhaust gas, some EGR systems may comprise two EGR coolers located in series along the EGR conduit. The first EGR cooler is designed to cool down the exhaust gas which comes at high temperature (up to about 700° C.) straight from the exhaust manifold, while the second EGR cooler receives the exhaust gas already partially cooled by the first EGR cooler and is designed to cool the exhaust gas at even lower temperature values (down to about 50° C.). In this way, the exhaust gas is subjected to two cooling stages, including a so called high-temperature cooling stage in the first EGR cooler and a so called low-temperature cooling stage in the second EGR cooler.

The first EGR cooler is usually connected to the cooling circuit of the internal combustion engine, so that the high-temperature cooling stage is performed with the aid of the same coolant used for cooling down other engine components, such as engine block and cylinder head. On the other hand, the second EGR cooler is connected to a dedicated coolant circuit, so that the low-temperature cooling stage is performed with the aid of a different coolant which can be maintained at a different temperature value. The dedicated coolant circuit generally comprises a main pump for circulating the coolant and a radiator for cooling the coolant once it has passed through the second EGR cooler.

In particular conditions, for example during the engine start-up phase in a cold environment, it could happen that the coolant used in the EGR cooler system is excessively cool. If such excessive cool coolant is supplied to the EGR cooler, the exhaust gas is also excessively cooled, resulting in an excessive decrease in temperature of the intake air. This may cause misfires in the internal combustion engine, adversely affecting the drivability. Furthermore, when the coolant temperature value drops below a predetermined temperature value, the vapor contained in the recirculated exhaust gas can condense in the second EGR cooler. This water condensation has a propensity to form aqueous acids when mixed with certain exhaust chemicals (such as, for example, a sulfur and nitrous oxide $NO_x$). These acids can, over time, cause the corrosion of the components of the EGR system. In addition, when the temperature of the coolant is excessively low, the soot contained in exhaust gas is prone to settle on the interior surfaces of the EGR, causing the latter to be less efficient and leading to fouling and potential plugging.

It is therefore an object of the present invention to provide an EGR system that can accelerate the warm up of the coolant in the low-temperature cooling stage.

Another object is to provide an EGR system that can perform a finer and more stable temperature control of the low-temperature cooling stage.

Another object is to reduce $NO_x$ emission while keeping hydrocarbon (HC) and carbon oxides (CO) emission within acceptable levels, and protecting vehicle driveability.

Still another object is to achieve the above mentioned objects with a simple, rational and rather inexpensive solution.

These and other objects are achieved by a EGR system and an Internal Combustion Engine (ICE) system having the features recited in the independent claims. The dependent claims delineate preferred and/or especially advantageous aspects of the various embodiment of the invention.

DISCLOSURE

In particular, an embodiment of the invention provides an exhaust gas recirculation system for an internal combustion engine comprising an exhaust gas recirculation conduit fluidly connecting an exhaust manifold to an intake manifold of the internal combustion engine, a first and a second exhaust gas coolers located in series in the exhaust gas recirculation conduit, each of the first and second exhaust gas coolers comprising an inlet and an outlet for a coolant. The coolant inlet and the coolant outlet of each of the two exhaust gas recirculation coolers are fluidly connected to a first and a second coolant circuit respectively, wherein the second coolant circuit particularly comprises a radiator having a coolant inlet in fluid communication with the coolant outlet of the second exhaust gas cooler, a pump having a coolant inlet in fluid communication with a coolant outlet of the radiator and a coolant outlet in fluid communication with the coolant inlet of the second exhaust gas cooler, an additional conduit fluidly connecting the coolant outlet of the exhaust cooler with the pump coolant inlet bypassing the radiator, and a valve configured to close the communication between the radiator outlet and the pump coolant inlet as long as a coolant temperature value is below a predetermined threshold value thereof.

Thanks to this solution it is possible to obtain a finer and more stable control of the temperature of the coolant used in the second EGR cooler. In particular, as long as the actual value of the coolant temperature is below the above mentioned threshold value, for example during an engine start-up phase or even during a running phase in very cold condition, the valve automatically closes the communication between the radiator outlet and the pump coolant inlet and the pump may be activated so that the coolant cyclically flows through the second EGR cooler and returns through the additional conduit, continuously bypassing the radiator. In this way, the coolant is warmed up more rapidly by the exhaust gas in the second EGR cooler and reaches faster the predetermined temperature threshold value. As a consequence, the efficiency of the EGR system is advantageously improved, whereas the fouling of the second EGR cooler is reduced. Furthermore, since the coolant is kept on circulating during the whole process, this solution advantageously avoid boiling effects of the coolant in the second EGR cooler.

According to an aspect of the present invention the valve is a mechanical thermostatic valve having an inlet in fluid communication with the radiator coolant outlet, an additional inlet in fluid communication with the coolant outlet of the second exhaust gas cooler via the additional conduit, and an outlet in fluid communication with the pump coolant inlet.

In this way it is possible to improve the efficiency of EGR system by employing a reliable component with reduced costs.

According to an alternative aspect of the present invention, the valve may be an electrically controlled valve connected to an Electronic Control unit that is configured to control the state of the valve.

Thanks to this solution the temperature control of the coolant temperature value can be obtained using a more sophisticated valve whose state is directly controlled by the Electronic Control unit, for example on the basis of a monitored value of the coolant temperature at the coolant outlet of the second EGR cooler. Another benefit is that of allowing a regulation of the threshold value of the coolant temperature for which the valve opens.

According to another aspect of the present invention the first coolant circuit is an engine coolant circuit.

Thanks to this solution the internal combustion engine layout is improved. In fact, by using the engine coolant circuit as coolant circuit for the EGR cooler, it is not necessary to provide for another dedicated coolant circuit.

According to still another aspect of the present invention, each of the first and second exhaust gas cooler comprises a coolant tube bundle having the respective inlet and outlet for the coolant, both the coolant tube bundles being accommodated inside a common external casing provided with an inlet and an outlet for an exhaust gas flow, so that the exhaust gas flow flows through the tube bundles in series.

Thanks to this solution the two EGR coolers can be compacted in one single component, thereby improving the layout of the EGR system and optimizing its design in view of the reduced spaces available in the engine compartment of the motor vehicles.

According to another aspect of the present invention, a bypass passage is defined inside the common external casing, for conveying the exhaust gas flow from downstream the tube bundle of the first exhaust gas cooler to the exhaust gas outlet of the common external casing bypassing the tube bundle of the second exhaust gas cooler.

Thanks to this solution, when a double cooling stage of the recirculated exhaust gas is not needed, the tube bundle of the second EGR cooler can be advantageously bypassed, therefore improving the thermal control of the exhaust gas.

According to another aspect of the present invention, the bypass passage is located inside the external casing between the tube bundle of the first exhaust gas cooler and the tube bundle of the second exhaust gas cooler The bypass located between the tube bundle of the first and the second EGR coolers promotes the thermal insulation of the two tube bundles, increasing their efficiency.

Another embodiment of the present invention provides an internal combustion engine system comprising an internal combustion engine, an intake manifold, an exhaust manifold and the exhaust gas recirculation system disclosed above.

This embodiment of the invention has the advantage of increasing the efficiency of the internal combustion engine, thanks to the use of an EGR system that actually presents increased fouling durability and increased efficiency.

BRIEF DESCRIPTION OF THE DRAWINGS

The present invention will now be described, by way of example, with reference to the accompanying drawings.

DETAILED DESCRIPTION

Figure 1:
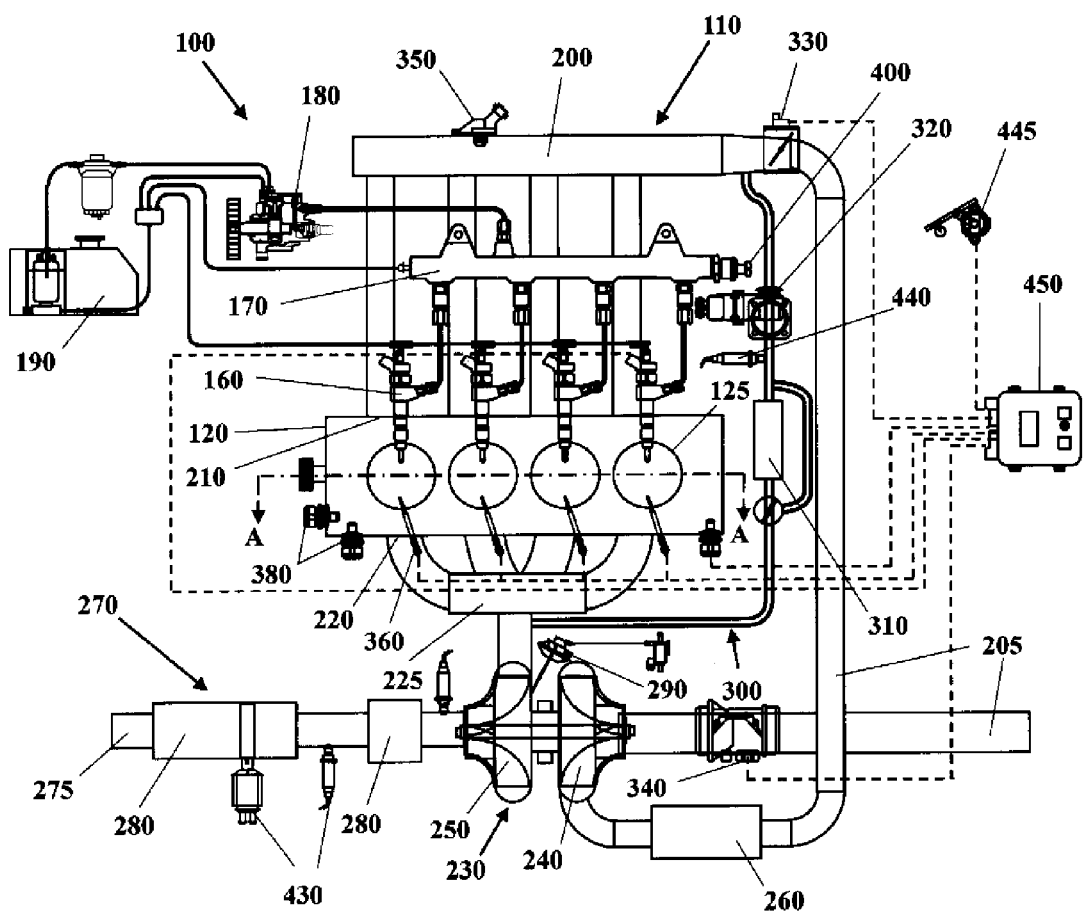
FIG. 1 shows an internal combustion engine system.
Figure 2:
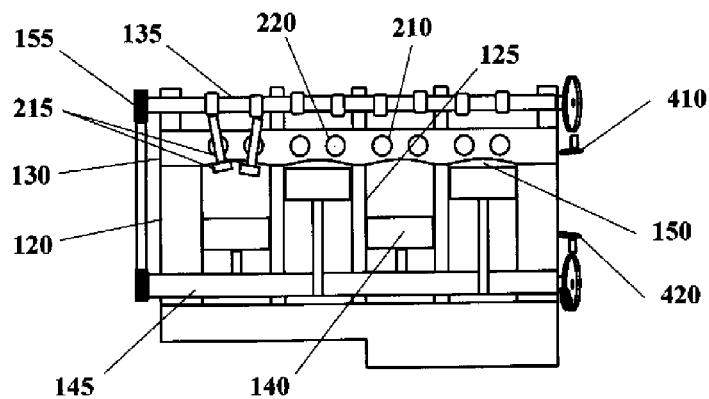
FIG. 2 is the section A-A of an internal combustion engine belonging to the system of FIG. 1.

Some embodiments may include an internal combustion engine system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increases the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through at least one exhaust port 220. In some examples, a cam phaser 155 may selectively vary the timing between the camshaft 135 and the crankshaft 145.

The air may be distributed to the air intake port(s) 210 through an intake manifold 200. An air intake pipe 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the intake pipe 205 and manifold 200. An intercooler 260 disposed in the intake pipe 205 may reduce the temperature of the air. The turbine 250 rotates by receiving exhaust gases from an exhaust manifold 225 that directs exhaust gases from the exhaust ports 220 and through a series of vanes prior to expansion through the turbine 250. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The exhaust gases exit the turbine 250 and are directed into an exhaust system 270. The exhaust system 270 may include an exhaust pipe 275 having one or more exhaust aftertreatment devices 280. The aftertreatment devices may be any device configured to change the composition of the exhaust gases. Some examples of aftertreatment devices 280 include, but are not limited to, catalytic converters (two and three way), oxidation catalysts, lean NOx traps, hydrocarbon adsorbers, selective catalytic reduction (SCR) systems, and particulate filters.

The internal combustion engine system 100 may further include an electronic control unit (ECU) 450 in communication with a memory system 460 and with one or more sensors and/or devices associated with the ICE 110. The ECU 450 may receive input signals from various sensors configured to generate the signals in proportion to various physical parameters associated with the ICE 110.

Figure 3:
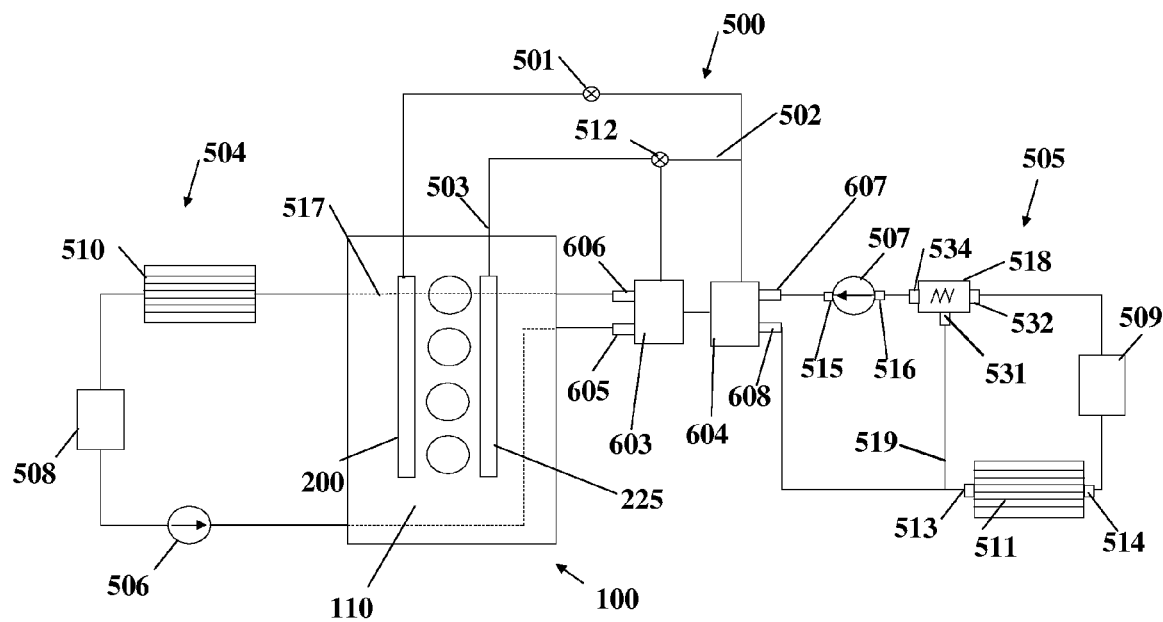
FIG. 3 schematically shows an exhaust gas recirculation (EGR) circuit belonging to the system of FIG. 1 according to an embodiment of the present invention.

As schematically shown in FIG. 3, the internal combustion engine system 100 may further comprise an exhaust gas recirculation (EGR) system 500 coupled between the exhaust manifold 225 and the intake manifold 200. The EGR system 500 is provided for routing back and feeding exhaust gas into the internal combustion engine 110, principally in order to reduce the emission of nitrogen oxides (NO$_x$).

According to an embodiment of the present invention, the EGR system 500 comprises an EGR conduit 503 fluidly connecting the exhaust manifold 225 to the intake manifold 200, and a first 603 and a second 604 EGR cooler located in series in the EGR conduit 503 to reduce the temperature value of the exhaust gases in the EGR system 500. In particular, the first EGR cooler 603 is designed to cool down the exhaust gas which comes at high temperature (up to about 700° C.) straight from the exhaust manifold 225, while the second EGR cooler 604 receives the exhaust gas already partially cooled by the first EGR cooler 603 and is designed to cool the exhaust gas at lower temperature values (down to about 50° C.). In this way, the exhaust gas is subjected to two cooling stages, including a so called high-temperature cooling stage in the first EGR cooler 603 and a so called low-temperature cooling stage in the second EGR cooler 604.

An EGR valve 501 downstream of the second EGR cooler 604, regulates a flow of exhaust gases. The EGR valve 501 is connected to the ECU 450 from which it can receive control signals. An EGR bypass conduit 502 is connected in parallel to the EGR coolers, 603 and 604, for bypassing them both. A bypass valve 512 can selectively allow or prevent the flow of the exhaust gas through the EGR bypass conduit 502. The bypass valve 512 is connected to the ECU 450 and may be controlled by the ECU 450, which may determine the path of the exhaust gas, for example on the basis of its temperature value and/or on the basis of the engine operating conditions. This is particular useful when the temperature value of the exhaust gas is already low, for example at the engine start-up when, in order to accelerate the warm-up of the ICE 110, the ECU 450 may be configured to open the bypass conduit 502, preventing the recirculated exhaust gas to be cooled the EGR coolers, 603 and 604.

The first EGR cooler 603 is connected, via a coolant inlet 605 and a coolant outlet 606, to a coolant circuit 504. Normally such coolant circuit 504 is the engine coolant circuit, so that the high-temperature cooling stage is performed with the aid of the same coolant used for cooling down other engine components, such as engine block and cylinder head. The engine coolant circuit 504 schematically comprises a coolant pump 506 that delivers an engine coolant, typically a mixture of water and antifreeze, from a coolant tank 508 to a system 517 of cooling channels internally defined by the engine block 120 and by the cylinder head 130, and a radiator 510 for cooling down the coolant, once it has passed through the system 517 of cooling channels and before it returns to the coolant tank 508.

The second EGR cooler 604 is fluidly connected, via a coolant inlet 607 and a coolant outlet 608, to a dedicated and independent coolant circuit 505. The coolant circuit 505 essentially comprise a tank 509 for a coolant, typically a mixture of water and antifreeze, a coolant pump 507 and a radiator 511. In some embodiments, not shown in figures, the radiator 511 can be defined as a portion of the radiator 510 of the engine coolant circuit 504. The coolant pump 507 is provided with a coolant inlet 516 in fluid communication with a coolant outlet 514 of the radiator 511 via the coolant tank 509, and with a coolant outlet 515 in fluid communication with the coolant inlet 607 of the second 604 exhaust gas cooler. In this way, the coolant pump 507 may deliver the coolant from the coolant tank 509 to the coolant inlet 607 of the second EGR cooler 604, allowing the coolant to flow therein. Furthermore, the radiator 511 is provided with a coolant inlet 513 in fluid communication with the coolant outlet 608 of the second exhaust gas cooler 604, for cooling down the coolant before it returns to the coolant tank 509.

In order to provide for an improved thermal management of the coolant in the coolant circuit 505, the coolant circuit 505 may comprise an additional conduit 519 fluidly connecting the coolant outlet 608 of the second EGR cooler 604 with the pump coolant inlet 516, effectively bypassing the radiator 511. The coolant circuit 505 further comprises a valve 518 configured to keep constantly open the communication between the pump coolant inlet 516 and the coolant outlet 608 of the second EGR cooler 604 via the above mentioned additional conduit 519, and for selectively closing the communication between the pump coolant inlet 516 and the radiator outlet 514 via the coolant tank 509. More particularly, the valve 518 is configured to close the communication between the pump coolant inlet 516 and the radiator outlet 514 as long as the actual value of the coolant temperature at the coolant outlet 608 of the second EGR cooler 604 is below a predetermined threshold value thereof, for example of 50° C.

Figure 4:
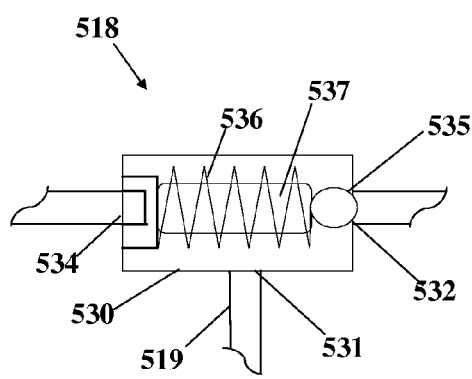
FIG. 4 is schematically representation of a valve for an EGR system according to an embodiment of the present invention.

The valve 518 may be a thermostatic mechanical valve, an embodiment of which is schematically shown in FIG. 4. The valve 518 comprises an external casing 530 equipped with two distinct coolant inlets, including a first inlet 531 in fluid communication with the additional conduit 519 and a second inlet 532 in fluid communication with the radiator outlet 514 via the coolant tank 509, and one single coolant outlet 534 in fluid communication with the pump inlet 516. The valve 518 further comprises a blocking element 535, for example in the form of a small ball, and a spring 536 arranged to thrust the blocking element 535 in a closing position of the second inlet 532. The blocking element 535 is kept in this closing position with the aid of a stick 537 which is made from a material, whose resilience varies with temperature, for example a stick of wax. In particular, the stick 537 is chosen so as to be rigid as long as the temperature value of the coolant flowing in the valve 518 (that comes from the second EGR cooler 604 via the additional conduit 519) is below the above mentioned threshold value, and to progressively soften when the temperature value exceeds such threshold value.

In this way, when the coolant temperature value is below the predetermined threshold value, the stick 537 is in a solid state and keeps the blocking element 535 in the closing position, effectively blocking the coolant inlet 532. As a consequence, under the action of the coolant pump 507, the coolant is allowed to flow only through the second EGR cooler 604 and the additional conduit 519, effectively bypassing the radiator 511. When the coolant temperature rises above the threshold value, the stick 537 softens and consequently the blocking element 535 starts moving away from the inlet 532, opposed only by the action of the spring 536. As a consequence, the inlet 532 progressively opens, allowing the coolant, under the action of the coolant pump 507, to flow also through the radiator 511.

The valve 518 may be alternatively realized as an electrically controlled valve connected to the ECU 450. The ECU 450 is in this case configured to send control signals to the valve 518 to manage the valve's state depending on the actual value of coolant temperature at the coolant outlet 608 of the second EGR cooler 604. This actual temperature value may be measured with a sensor, and the threshold value thereof may be stored in the memory system 460.

Figure 5:
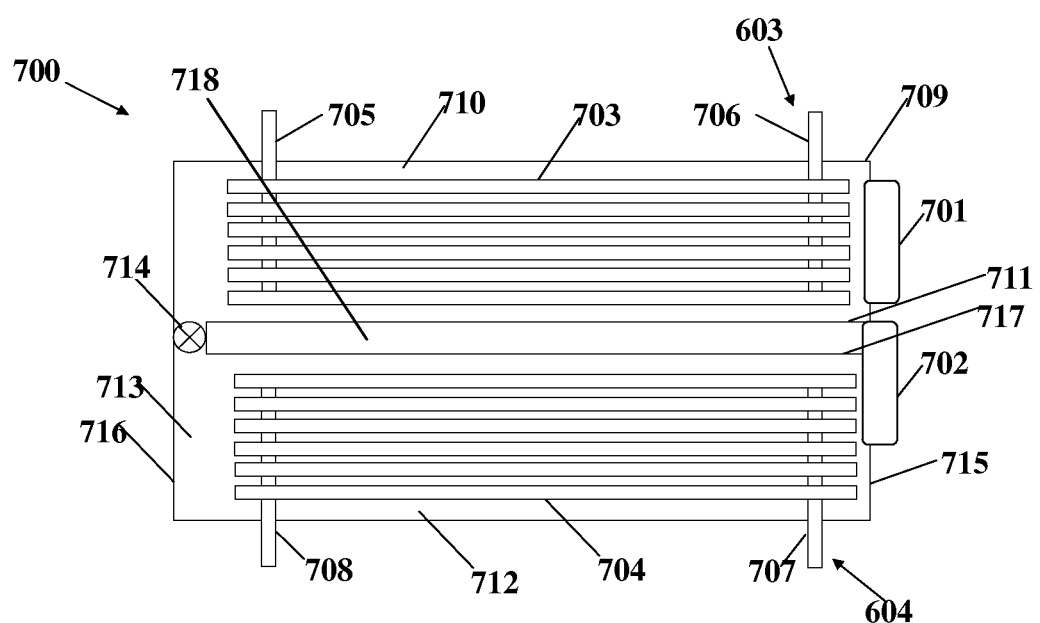
FIG. 5 schematically shows a dual-temperature exhaust gas recirculation cooler according to an embodiment of the present invention.

In some embodiments, the first 603 and second 604 EGR coolers may be embodied in a single component 700, as shown in FIG. 5, which is conventionally named dual-temperature EGR cooler.

The dual-temperature EGR cooler 700 comprises an external casing 709 provided with an inlet 701 and with an outlet 702 for the exhaust gas flow. In this example, the exhaust gas inlet 701 and exhaust gas outlet 702 are located on a same lateral wall 715 of the external casing 709. Referring to the scheme of FIG. 3, the exhaust gas inlet 701 may be fluidly connected to the exhaust manifold 225 and the exhaust gas outlet 702 may be fluidly connected to the intake manifold 200.

The external casing 709 internally accommodates two tube bundles 703 and 704, which are individually provided for circulating a coolant suitable to cool down the exhaust gas. Each of the two tube bundles, 703 and 704, comprises a coolant inlet, respectively indicated as 705 and 707, and a coolant outlet, respectively indicated as 706 and 708. Each of the two tube bundles, 703 and 704, further comprises a plurality of tubes having open ends fluidly connected to the respective coolant inlet, 705 and 707, and to the respective coolant outlet, 706 and 708, allowing the flowing of the coolant through the tubes. All the coolant inlets and outlets jut out from the external casing 709. Referring to the scheme of FIG. 3, the tube bundle 703 may be fluidly connected, via the respective coolant inlet 705 and outlet 706, with the engine coolant circuit 504, whereas the tube bundle 704 may be fluidly connected, via the respective coolant inlet 705 and outlet 706, to the coolant circuit 505, effectively replacing both the exhaust gas cooler 603 and 604.

The internal volume of the external casing 709 is arranged so that the exhaust gas flow, which flows from the exhaust gas inlet 701 to the exhaust gas outlet 702, is normally forced to sweep through the two tube bundles 703 and 704 in series, i.e. firstly through the tube bundle 703 and then through the tube bundles 704.

In greater details, the dual-temperature EGR cooler 700 comprises an internal separating wall 711, which extends within the external casing 709 from the lateral wall 715, between the exhaust gas inlet 701 and exhaust gas outlet 702, until a proximity of an opposite lateral wall 716 of the external casing 709. This separating wall 711 ideally divides the internal volume of the external casing 709 in two chambers: a first chamber 710 in direct communication with the exhaust gas inlet 701 and being delimited above by an upper casing wall and below by the separating wall 711; and a second chamber 712 in direct communication with the exhaust gas outlet 702 and being delimited above by the separating wall 711 and below by a lower casing wall. The chambers 710 and 712 are in fluid communication with each other through a connecting passage 713, which is defined within the external casing 709 between the free end of the separating wall 711 and the lateral wall 716. In this way, the exhaust gas flow, which flows from the exhaust gas inlet 701 to the exhaust gas outlet 702, is forced by the separating wall 711 in a U-shaped path, passing through the first chamber 710, the connecting passage 713 and the second chamber 712. The tube bundle 703 is accommodated inside the first chamber 710 and the tube bundle 704 is accommodated inside the second chamber 712, so that they are located in series along the above mentioned U-shaped path.

As a consequence, in normal operation, the exhaust gas enters into the external casing 709 via the exhaust gas inlet 701, flows around the tubes of the first tube bundle 703, passes through the connecting passage 713, flows around the tubes of the second tube bundle 704, and then exits from the external casing 709 via the exhaust gas outlet 702.

When the exhaust gas enters into the external casing 709, it normally has a very high temperature value, for example up to 700° C. The temperature value of the exhaust gas is then at least partially decreased when it sweeps through the tube bundle 703 by exchange of heat with the coolant of the engine coolant circuit 504. When the exhaust gas sweeps through the tube bundle 704, its temperature value is further decreased, for example down to 50° C., by heat exchange with the coolant of the coolant circuit 505.

The dual-temperature EGR cooler 700 further comprises an additional separating wall 717, which extends within the external casing 709 from the lateral wall 715 until a proximity of an opposite lateral wall 716 of the external casing 709. The additional separating wall 717 is parallel and spaced apart from the separating wall 711, thereby defining with the latter a hollow passage 718, which separates the tube bundle 703 from the tube bundle 704 and which fluidly connects the exhaust gas outlet 702 directly to the connecting passage 713.

This hollow passage 718 attains the double function of improving the thermal insulation between the tube bundle 703 and the tube bundle 704, and defining a bypass passage for conveying the exhaust gas flow from downstream the tube bundle 703 to the exhaust gas outlet 702 of the external casing 709, bypassing the tube bundle 704.

Alternatively the hollow passage 718 may be defined by one or more conduits located between the first 703 and the second tube bundle 704, and having opposite open ends fluidly connected to the connecting passage 713 and to the exhaust gas outlet 702.

The dual-temperature EGR cooler 700 is further provided with a valve 714 for selectively allowing the exhaust gas to flow into the hollow passage 718 and bypass the tube bundle 704, reducing the amount of the exhaust gas through the second tube bundle 704 and therefore the amount of soot which is responsible for fouling and clogging.

The valve 714 is located in the connecting passage 713 in correspondence of the inlet of the hollow passage 718 and is connected to the ECU 450. The ECU 450 is configured to send control signals to valve 714. The valve 714 can be realized using a flap suitable to move between a first position in which the flap blocks the hollow passage 718 and allows the exhaust gas to flow through the second tube bundle 704, and a second position in which the flap allows the exhaust gas to flow into the hollow passage 718 towards the exhaust gas outlet 702, effectively causing the exhaust gas to bypass the second tube bundle 704.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the forgoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and in their legal equivalents.

The invention claimed is:

1. An exhaust gas recirculation system comprising:
    an exhaust gas recirculation conduit;
    first and second exhaust gas coolers located in series in the exhaust gas recirculation conduit, each of the first and second exhaust gas coolers including a coolant inlet and a coolant outlet for a coolant fluidly connected to a first and a second coolant circuit, respectively, wherein the second coolant circuit includes a radiator having a coolant inlet in fluid communication with the coolant outlet of the second exhaust gas cooler, and wherein the first coolant circuit is an engine coolant circuit;
    a pump having a pump coolant inlet in fluid communication with a coolant radiator outlet of the radiator and a pump coolant outlet in fluid communication with the coolant inlet of the second exhaust gas cooler;
    an additional conduit fluidly connecting the coolant outlet of the second exhaust cooler with the pump coolant inlet bypassing the radiator; and
    a valve configured to close the communication between the radiator coolant outlet and the pump coolant inlet as long as a coolant temperature value is below a threshold value thereof.

2. The exhaust gas recirculation system according to claim 1, wherein the valve is a mechanical thermostatic valve having an inlet in fluid communication with the radiator coolant outlet, an additional inlet in fluid communication with the coolant outlet of the second exhaust gas cooler via the additional conduit, and an outlet in fluid communication with the pump coolant inlet.

3. The exhaust gas recirculation system according to claim 1 wherein the valve is an electrically controlled valve connected to an electronic control unit configured to control the state of the valve.

4. The exhaust gas recirculation system according to claim 1, wherein each of the first and second exhaust gas cooler comprises a coolant tube bundle having the respective inlet and outlet for the coolant, both the coolant tube bundles being accommodated inside a common external casing provided with an inlet and an outlet for an exhaust gas flow, so that the exhaust gas flow flows through the tube bundles in series.

5. The exhaust gas recirculation system according to claim 4, wherein a bypass passage is defined inside the common external casing, for conveying the exhaust gas flow from downstream of the tube bundle of the first exhaust gas cooler to the exhaust gas outlet of the common external casing bypassing the tube bundle of the second exhaust gas cooler.

6. The exhaust gas recirculation system according to claim 5, wherein the bypass passage is located inside the external casing between the tube bundle of the first exhaust gas cooler and the tube bundle of the second exhaust gas cooler.

7. The exhaust gas recirculation system according to claim 1, wherein the exhaust gas recirculation system is part of an internal combustion engine system having an internal combustion engine equipped with an intake manifold and an exhaust manifold, said exhaust gas recirculation conduit fluidly connecting the exhaust manifold to the intake manifold.

8. An internal combustion engine system comprising:
    an internal combustion engine and an exhaust gas recirculation system, said internal combustion engine including an intake manifold and an exhaust manifold, said exhaust gas recirculation system including an exhaust gas recirculation conduit fluidly connecting the exhaust manifold to the intake manifold;
    first and second exhaust gas coolers located in series in the exhaust gas recirculation conduit, each of the first and second exhaust gas coolers including a coolant inlet and a coolant outlet for a coolant fluidly connected to a first and a second coolant circuit, respectively, wherein the second coolant circuit includes a radiator having a coolant inlet in fluid communication with the coolant outlet of the second exhaust gas cooler, and wherein the first coolant circuit is an engine coolant circuit;
    a pump having a pump coolant inlet in fluid communication with a coolant radiator outlet of the radiator and a pump coolant outlet in fluid communication with the coolant inlet of the second exhaust gas cooler;
    an additional conduit fluidly connecting the coolant outlet of the second exhaust cooler with the pump coolant inlet bypassing the radiator; and
    a valve configured to close the communication between the radiator coolant outlet and the pump coolant inlet as long as a coolant temperature value is below a threshold value thereof.

9. The internal combustion engine system according to claim 8, wherein the valve is a mechanical thermostatic valve having an inlet in fluid communication with the radiator coolant outlet, an additional inlet in fluid communication with the coolant outlet of the second exhaust gas cooler via the additional conduit, and an outlet in fluid communication with the pump coolant inlet.

10. The internal combustion engine system according to claim 8, wherein the valve is an electrically controlled valve connected to an electronic control unit configured to control the state of the valve.

11. The internal combustion engine system according to claim 8, wherein each of the first and second exhaust gas cooler comprises a coolant tube bundle having the respective inlet and outlet for the coolant, both the coolant tube bundles being accommodated inside a common external casing provided with an inlet and an outlet for an exhaust gas flow, so that the exhaust gas flow flows through the tube bundles in series.

12. The internal combustion engine system according to claim 11, wherein a bypass passage is defined inside the common external casing, for conveying the exhaust gas flow from downstream of the tube bundle of the first exhaust gas cooler to the exhaust gas outlet of the common external casing bypassing the tube bundle of the second exhaust gas cooler.

13. The internal combustion engine system according to claim 12, wherein the bypass passage is located inside the external casing between the tube bundle of the first exhaust gas cooler and the tube bundle of the second exhaust gas cooler.

14. An exhaust gas recirculation system comprising:
    an exhaust gas recirculation conduit;
    first and second exhaust gas coolers located in series in the exhaust gas recirculation conduit, each of the first and second exhaust gas coolers including a coolant inlet and a coolant outlet for a coolant fluidly connected to a first and a second coolant circuit, respectively, wherein the second coolant circuit includes a radiator having a coolant inlet in fluid communication with the coolant outlet of the second exhaust gas cooler;
    a pump having a pump coolant inlet in fluid communication with a coolant radiator outlet of the radiator and a pump coolant outlet in fluid communication with the coolant inlet of the second exhaust gas cooler;

an additional conduit fluidly connecting the coolant outlet of the second exhaust cooler with the pump coolant inlet bypassing the radiator; and a valve configured to close the communication between the radiator coolant outlet and the pump coolant inlet as long as a coolant temperature value is below a threshold value thereof, wherein each of the first and second exhaust gas cooler includes a coolant tube bundle having the respective inlet and outlet for the coolant, both the coolant tube bundles being accommodated inside a common external casing provided with an inlet and an outlet for an exhaust gas flow so that the exhaust gas flow flows through the tube bundles in series, and wherein a bypass passage is defined inside the common external casing for conveying the exhaust gas flow from downstream of the tube bundle of the first exhaust gas cooler to the exhaust gas outlet of the common external casing bypassing the tube bundle of the second exhaust gas cooler, and wherein the bypass passage is located inside the external casing between the tube bundle of the first exhaust gas cooler and the tube bundle of the second exhaust gas cooler.

* * * * *